(12) United States Patent
Ryu et al.

(10) Patent No.: US 8,125,507 B2
(45) Date of Patent: Feb. 28, 2012

(54) VIDEO CALL APPARATUS FOR MOBILE COMMUNICATION TERMINAL AND METHOD THEREOF

(75) Inventors: Jae-Hun Ryu, Seoul (KR); Hang-Shin Cho, Seoul (KR); Tae-Seong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1468 days.

(21) Appl. No.: 11/524,437

(22) Filed: Sep. 21, 2006

(65) Prior Publication Data

US 2007/0070182 A1 Mar. 29, 2007

(30) Foreign Application Priority Data

Sep. 23, 2005 (KR) .......................... 10-2005-0088983
May 3, 2006 (KR) .......................... 10-2006-0040194

(51) Int. Cl.
*H04N 7/14* (2006.01)
(52) U.S. Cl. ................ 348/14.02; 348/14.01; 455/426.1
(58) Field of Classification Search .... 348/14.01–14.16; 379/221.14, 221.08, 221.09, 221.1, 221.12; 370/352–356, 373, 377, 384, 385, 522, 524; 455/426.1, 434, 462
See application file for complete search history.

(56) References Cited

U.S. PATENT DOCUMENTS

| | | | |
|---|---|---|---|
| 6,879,828 B2 * | 4/2005 | Virtanen et al. | 455/426.1 |
| 7,139,566 B2 * | 11/2006 | Ko et al. | 455/426.1 |
| 2005/0075098 A1 * | 4/2005 | Lee et al. | 455/414.1 |

FOREIGN PATENT DOCUMENTS

| | | |
|---|---|---|
| EP | 1 185 105 A2 | 3/2002 |
| GB | 2391646 A * | 2/2004 |
| JP | 7-131771 A | 5/1995 |
| JP | 7-322225 A | 12/1995 |
| JP | 8-322029 A | 12/1996 |
| JP | 2004-104424 A | 4/2004 |
| JP | 2005-94659 A | 4/2005 |
| KR | 2003-0082318 A | 10/2003 |
| WO | WO 96/32802 | 10/1996 |
| WO | WO 02/052811 A1 | 7/2002 |

OTHER PUBLICATIONS

Nilsson, "Control Protocol for Multimedia Communication—Version 12", International Telecommunication Union, Geneva, CH., vol. Study Group 16, pp. 1-349, Jul. 26-Aug. 2005, XP017411431.

* cited by examiner

*Primary Examiner* — Melur Ramakrishnaiah
(74) *Attorney, Agent, or Firm* — Birch, Stewart, Kolasch & Birch, LLP (57) ABSTRACT

A mobile communication terminal, including an input unit configured to receive multimedia data corresponding to an additional service other than an established video call, a controller configured to codec-process the received multimedia data, and a transceiver configured to transmit the multimedia data during the video call.

13 Claims, 9 Drawing Sheets

VIDEO CALL APPARATUS FOR MOBILE COMMUNICATION TERMINAL AND METHOD THEREOF

RELATED APPLICATION

The present application claims priority to Korean Application Nos. 10-2005-0088983, filed in Korea on Sep. 23, 2005, and 10-2006-0040194 filed on May 3, 2006, which are herein expressly incorporated by reference in their entirety.

BACKGROUND OF THE INVENTION

1. Field of the Invention

The present invention relates to a mobile communication terminal and corresponding method that allows a user to perform an additional function during a video call.

2. Discussion of the Related Art

A mobile communication terminal includes wireless communication functions in addition to a camera function, a multimedia playing function, etc. Thus, mobile terminals now include a digital camera having a high resolution and a color (Liquid Crystal Display) LCD screen. The camera and multimedia playing functions are becoming more popular, because the display apparatus of the terminal is improving and the terminal is communicating via high speed communication techniques.

In addition, streaming video/audio data is displayed on the color LCD screen of the mobile terminal. Video/audio data captured by the camera may also be displayed on the color LCD screen. Further, the mobile terminal can also transceive the video/audio data captured by the camera in real time, which allows users to communicate with each other via a video call service.

However, the related art video call mobile communication service is based only on the H.324M protocol. Accordingly, the video call service is unable to support any additional service during the video call.

SUMMARY OF THE INVENTION

Accordingly, one object of the present invention is to address the above-noted and other problems.

Another object of the present invention is to provide a mobile terminal and corresponding method that allows a user to use another service such as a chat service while a video call is performed.

To achieve these and other advantages and in accordance with the purpose of the present invention, as embodied and broadly described herein, the present invention provides in one aspect a mobile communication terminal including an input unit configured to receive multimedia data corresponding to an additional service other than an established video call, a controller configured to codec-process the received multimedia data, and a transceiver configured to transmit the multimedia data during the video call.

In another aspect, the present invention provides a mobile terminal communication method, comprising: establishing a video call connection between a first mobile communication terminal and a second mobile communication terminal for a video call; and performing an additional service during the video call, said additional service corresponding to multimedia data being transmitted between the first and second terminals during the video call.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

The present invention advantageously allows the user to use an additional service such as a chat service while simultaneously performing a video call using the H.324M protocol. In more detail, FIG. 1 is an overview illustrating a system for providing a video call service of a mobile terminal according to an embodiment of the present invention.

As shown, the system includes a first and second mobile communication terminals 100 and 200 communicating with each other over a network 300. The first terminal 100 multiplexes video/audio data relevant to a video call service and multimedia data relevant to an additional service and then outputs the multiplexed data to the mobile terminal 200. The mobile terminal 200 then demultiplexes the received video/audio and multimedia data and outputs the demultiplexed data.

Figure 2:
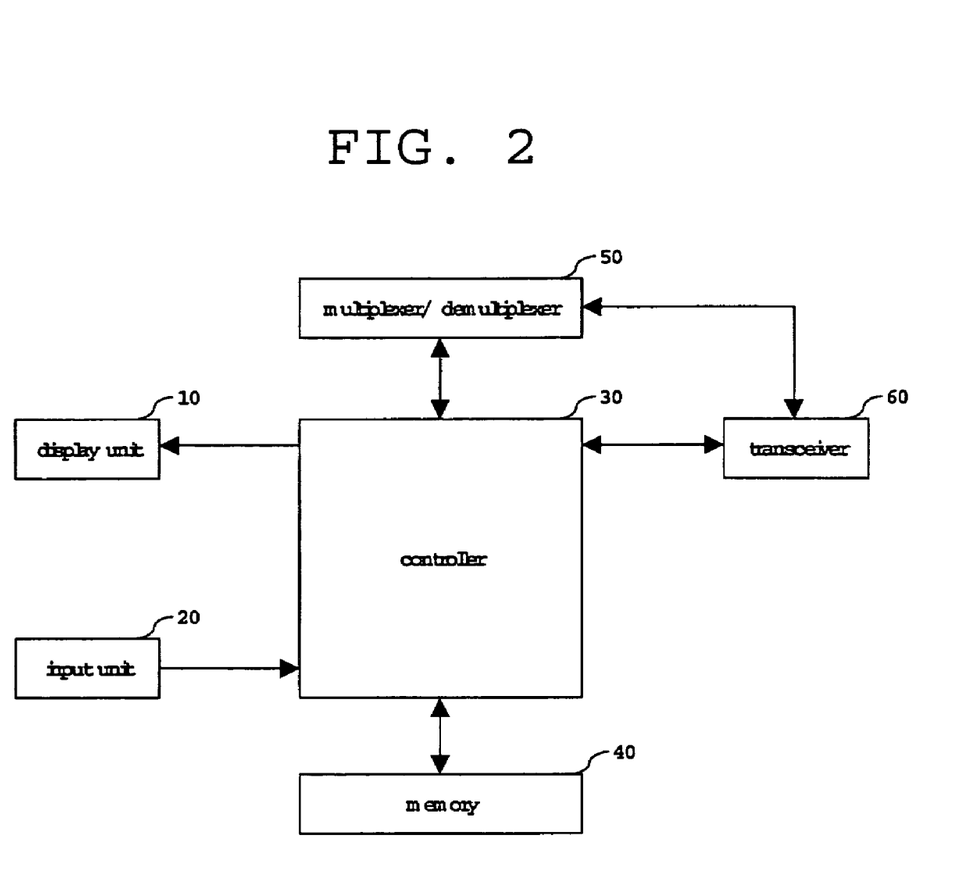
FIG. 2 is a block diagram showing a video call apparatus for a mobile communication terminal according to an embodiment of the present invention.

Turning next to FIG. 2, which is a block diagram illustrating a video call apparatus for a mobile terminal according to an embodiment of the present invention. As shown, the video call apparatus includes a display unit 10 for displaying video data received from another party's terminal during a video call, an input unit 20 for inputting multimedia data to be transmitted, a send command when inputting text data during a video call, etc., and a memory 40 for storing multimedia data to be transmitted or video data transceived during a video call. The apparatus also includes a multiplexer 50 for multiplexing the multimedia data and video data, a transceiver 60 for transceiving the multiplexed data or transceiving video data during a video call, and a controller 30 for controlling an overall operation of the video call service.

Figure 1:
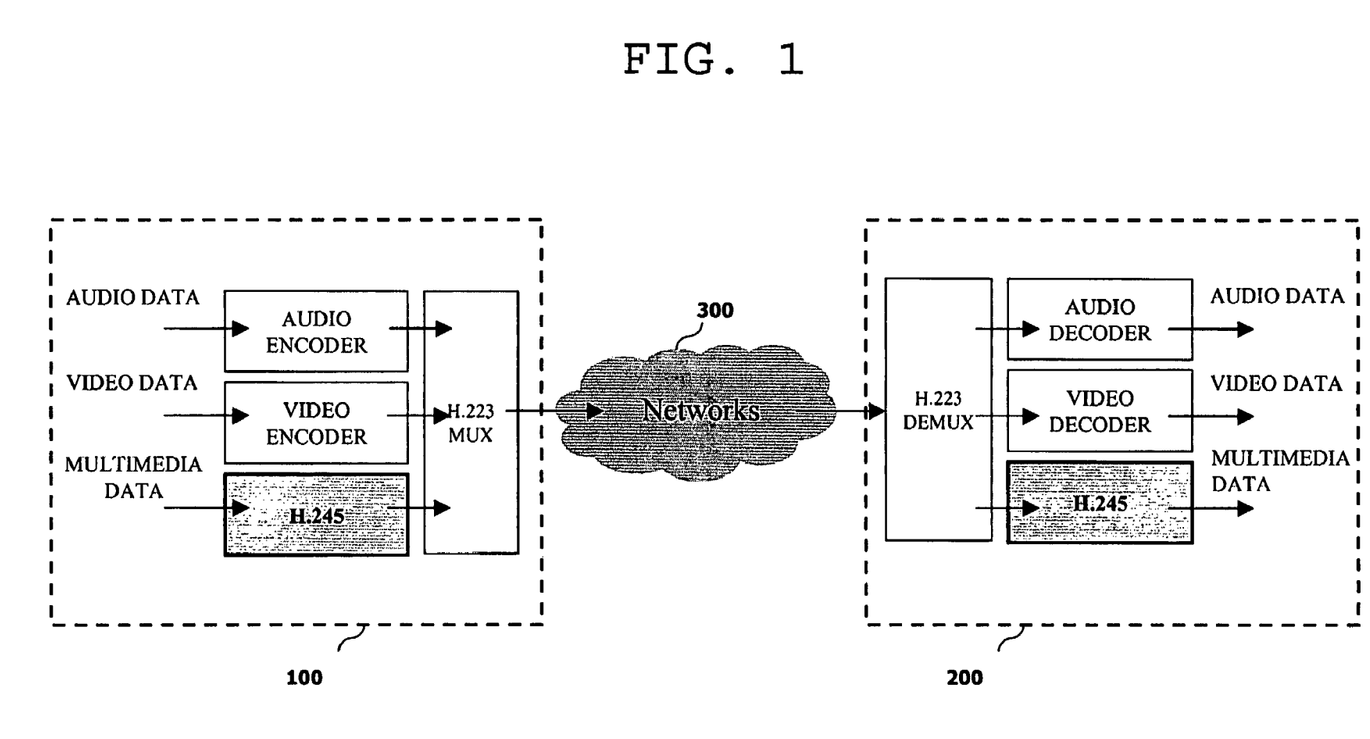
FIG. 1 is an overview illustrating a system for providing a video call service of a mobile communication terminal according to an embodiment of the present invention.

Thus, with reference to FIGS. 1 and 2, when a user wants to transmit a text message or multimedia data to another party's terminal during an ongoing video call, the user enters the text message or multimedia data using the input unit 20. The multimedia data includes audio data, video data, text data, etc. In addition, when the data to be transmitted is audio data, the audio data is processed by an audio codec, AMR processor or G.723.1 processor. Then, the processed audio data is multiplexed by an H.223 multiplexer thus to be transmitted to another party's terminal.

In addition, when the data to be transmitted is video data, the video data is processed by a video codec, H.263 processor or an MPEG4 processor. Then, the processed video data is multiplexed by an H.223 multiplexer thus to be transmitted to the other party's terminal. In addition, the controller 30 may include a T.120 processor for processing data for a multiplex conference, and/or a module or an additional device for processing transmitted video/audio or text data in accordance with each protocol, etc. In addition, when a command for controlling the other party's terminal (such as a vibration mode control command, a key pad control command, etc.) is input via the input unit 20, the command is included in the multimedia data and transmitted to the other party's terminal via an H.245 protocol module.

Figure 3:
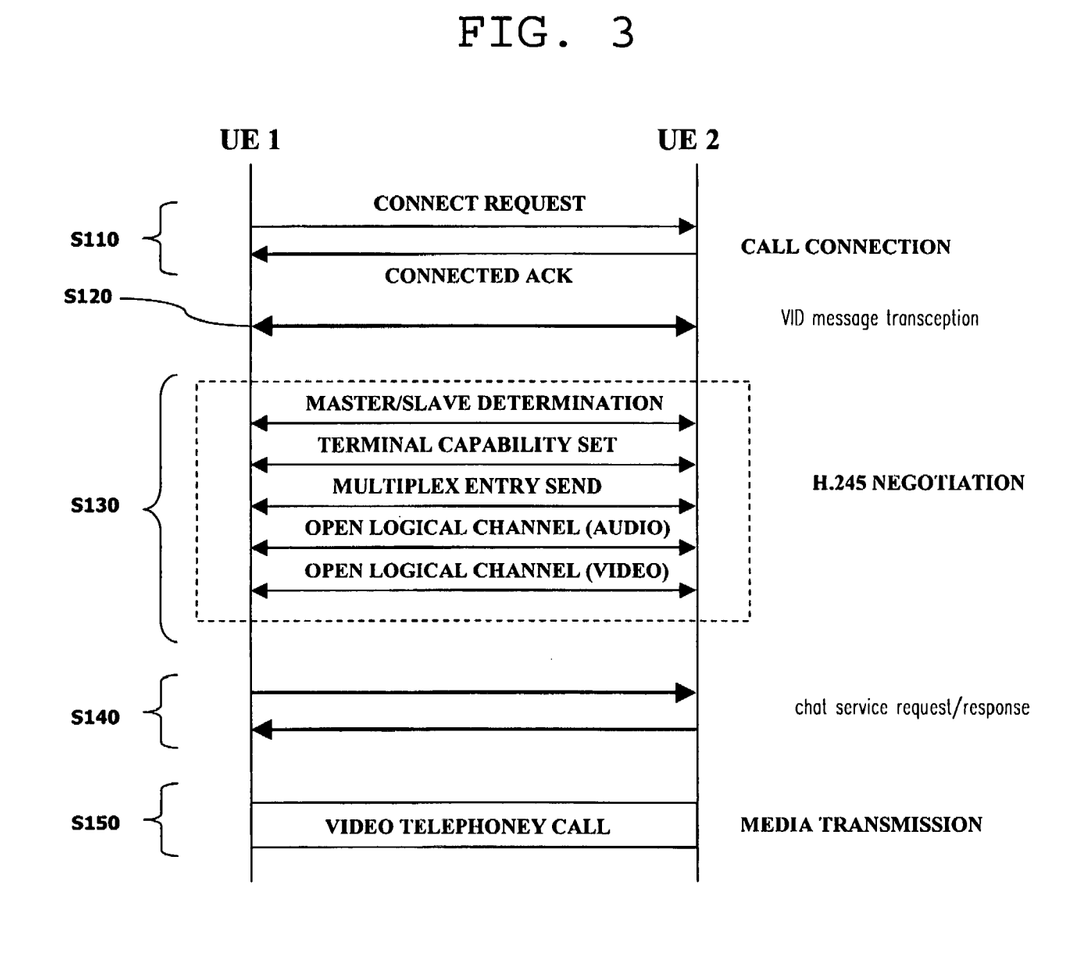
FIG. 3 is a flow diagram showing a method for establishing a video call between two mobile terminals according to an embodiment of the present invention.

Next, FIG. 3 is a flow diagram illustrating a method for establishing a video call between two mobile communication terminals (i.e., first and second terminals 100 and 200) according to an embodiment of the present invention. As shown, a call connection is first established by the terminal 100 issuing a connect request to the terminal 200 and the terminal 200 acknowledging the request (S110). Accordingly, a call connection is established between the first and second terminals 100 and 200. Then, the first and second terminals 100 and 200 send a vendor ID (VID) message to each other (S210). The VID includes a nation code, a manufacturing company code, a model name, a version, etc.

Next, the first and second terminals 100 and 200 perform an H.245 negotiation process (S130). For example, and as shown in step S130, the first and second terminals 100 and 200 perform a negotiation process to determine which terminal is the master terminal and which is the slave terminal by exchanging a Master/Slave Determination message, and to determine an video/audio processing capabilities of each terminal by exchanging a Terminal Capacity Set message. The negotiation process also includes transmitting a Multiplex Entry Send message, an Open Logical Channel (Audio) message to assign a logical channel, and an Open Logical Channel (Video) message to open the logical channel.

After the Logical Channel is opened in step S130, the first terminal 100 requests a chat service with the second terminal 200, and the second terminal 200 responds to the request such that the first and second terminals 100 and 200 can perform a chat service during a video call (S140). However, when a response from the second terminal 200 is not received within a certain time (for example, 6 seconds) or a no-allowance message for a chat service is received from the second terminal 200, the first terminal 100 informs the user of the first terminal 100 about the error by outputting a message on a display unit, to a speaker, etc.

Then, the first terminal 100 transmits the video/audio data to the second terminal 200 through an H.233 multiplexer based on the negotiated control information (S150). Then, the second terminal 200 demultiplexes the received video/audio data through an H.233 demultiplexer and outputs the data. That is, the first terminal 100 performs a video call with the second terminal 200.

Figure 4:
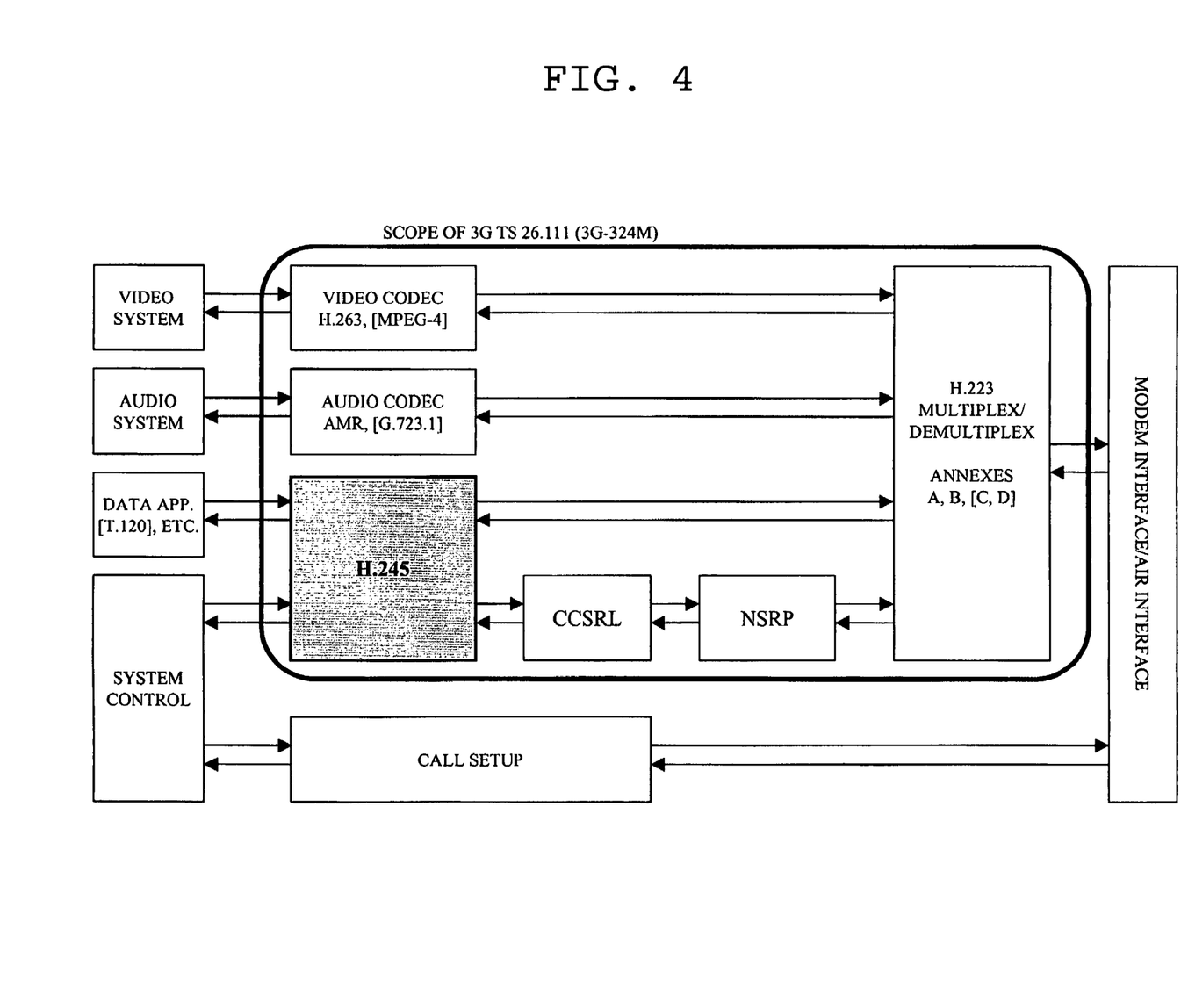
FIG. 4 is a block diagram showing an H.324M protocol for providing a video call service of a mobile terminal according to an embodiment of the present invention.

Turning next to FIG. 4, which is a block diagram illustrating the H.324M protocol for providing a video call service of a mobile terminal according to an embodiment of the present invention. As shown, the mobile terminal processes video data relevant to video call service by a video codec, H.263 or an MPEG4 processor, and processes audio data by an audio codec, an Adaptive Multi-Rate (AMR) or G.723.1 processor. The processed data is then multiplexed by an H.223 multiplexer and the data is output to a modem interface.

Thus, in accordance with an embodiment of the present invention, the mobile terminal can send and receive not only control information but also multimedia information relevant to an additional service during a video call using the H.245 protocol. Further, as shown in FIG. 4, the mobile may also include a T.120 processor to process data for a multiplex conference. A Control Channel Segmentation and Re-assembly (CCSRL) is also provided to enable a stable exchange of an H.245 message between the first and second terminals as an implementation of a Segmentation And Re-assembly (SAR) of a control frame defined by an H.324/Attachment C. The terminal also includes an NSRP command for packing the CCSRL segment into a maximum size of 2048 octets.

Figure 5:
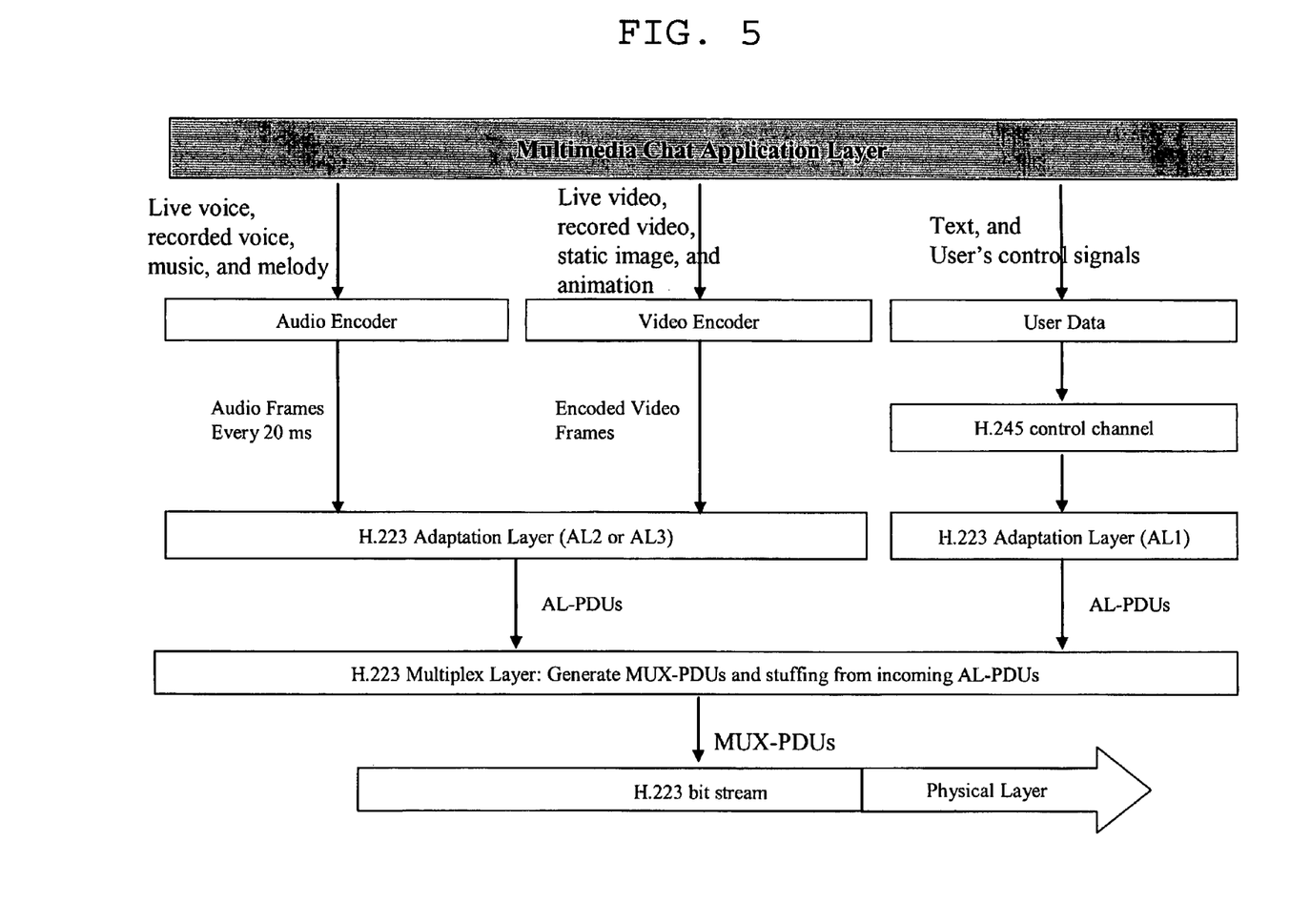
FIG. 5 is a block diagram showing a multimedia application layer for transceiving multimedia data during a video call according to an embodiment of the present invention.

Next, FIG. 5 is a block diagram illustrating a multimedia application layer for transceiving multimedia data during a video call according to an embodiment of the present invention. As shown, an audio encoder encodes audio data such as a live voice signal input into a microphone during a video call, a recorded voice stored in the terminal before the video call is performed, music transmitted from a terminal manufacturing company or downloaded through the Internet, and audio data such as a melody. The encoded data is received and processed in a User Data Layer of the protocol stack.

In addition, a video encoder encodes video data such as video data captured in real time by a camera during a video call, video data transmitted from a terminal manufacturing company or video data previously captured by a user using a camcorder function, an image captured by the camera, and video data such as an animation. The encoded data is also received and processed in the User Data Layer of the protocol stack. Further, the User Data layer also processes text data, and a control signal for controlling the other party's terminal such as a vibration mode control, a key pad control, etc., using a User Data block based on the H.245 protocol.

In addition, as shown in FIG. 5, the data encoded by the audio/video encoder generates an AL-Protocol Data Unit (PDU) using the H.223 Adaptation Layer 2 (AL 2 or AL3), and generates an AL-PDU using the H.223 Adaption Layer (AL1) for an H.245 control signal. Further, each AL-PDUs is multiplexed at the H.223 Multiplex Layer to generate a bit stream that is transmitted to a wireless network through a WCDMA modem.

Accordingly, audio data, video data, and text data can be transmitted in real time to another party's terminal during a video call. Further, recorded video or audio data can be transmitted to another party's terminal when a response for a received call is not performed within a certain time during a video call. Also, previously input text, stored music, stored video data, or an avatar can be transmitted to another party's terminal during a video call.

Figure 6:
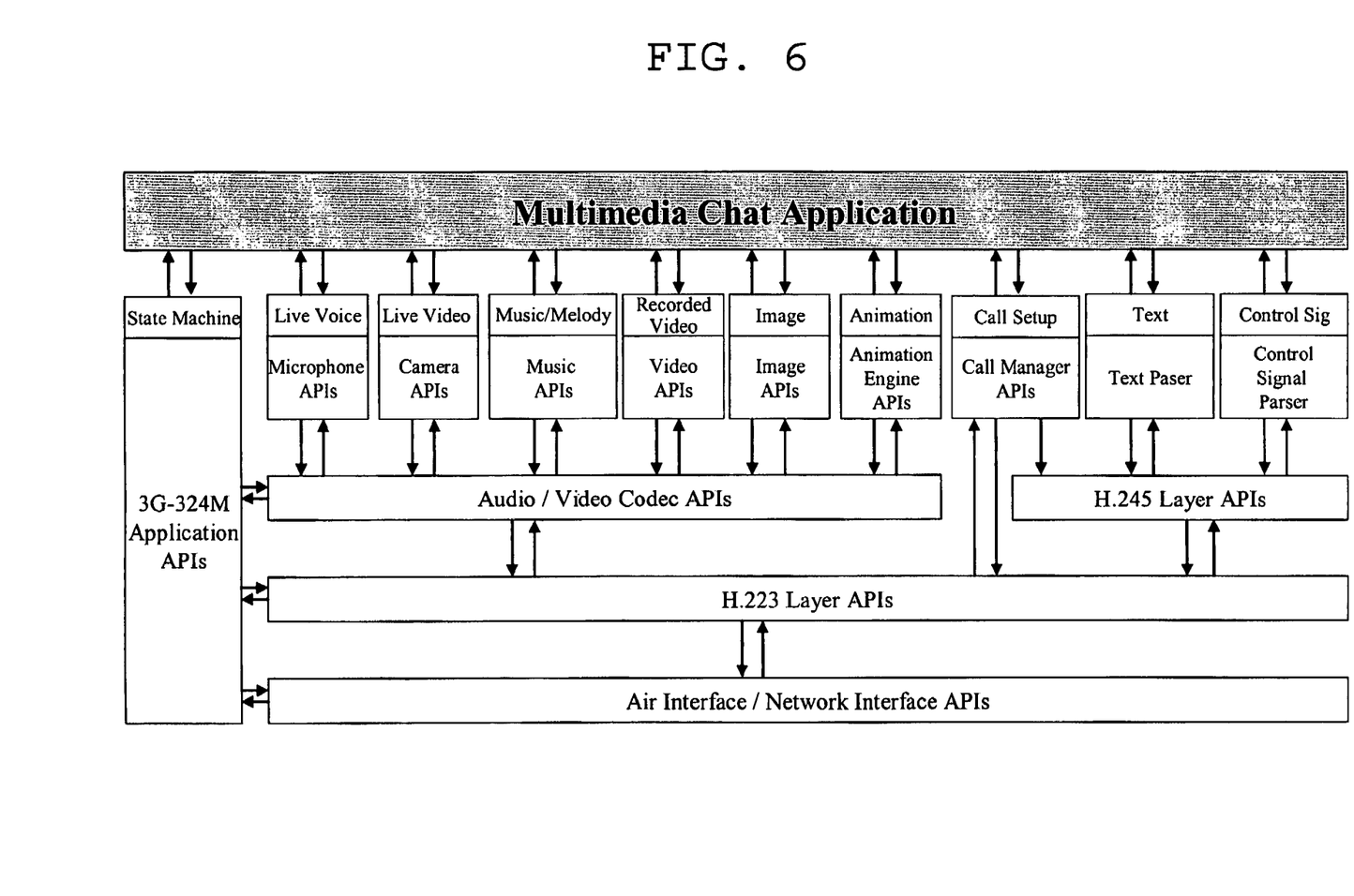
FIG. 6 is a block diagram showing an Application Programming Interface (API) structure for transceiving multimedia data during a video call according to an embodiment of the present invention.

Turning now to FIG. 6, which is a block diagram illustrating an Application Programming Interface (API) structure for sending and receiving multimedia data during a video call according to an embodiment of the present invention. As shown, the API structure is based on 3G-324M software for a multimedia video chat. In addition, APIs for data input during a video call are defined, and data is sent and received via APIs of relevant layers. Audio/video data is processed through Audio/Video codec APIs, and a control signal is processed through H.245 APIs. Also, call setup APIs call H.245 and H223 Multiplexer APIs.

Figure 7:
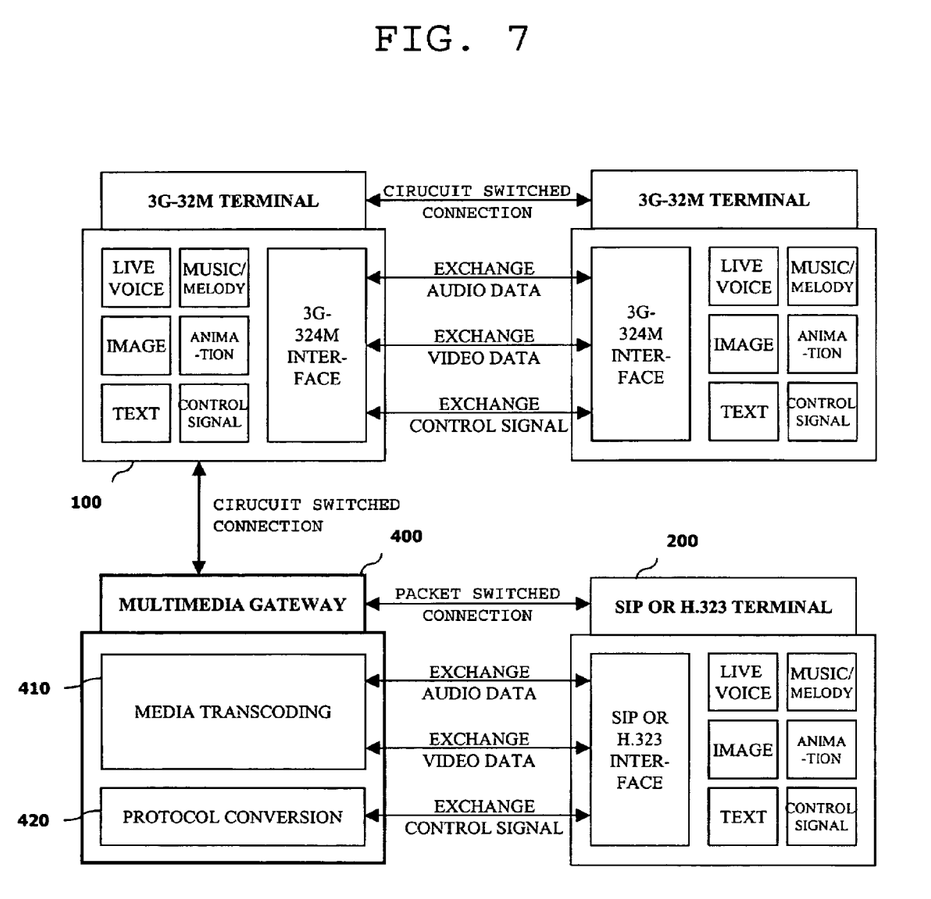
FIG. 7 is a block diagram showing a system for providing a video call service of a mobile terminal through different mobile communication networks according to an embodiment of the present invention.

Next, FIG. 7 is a block diagram showing a system for providing a video call service of a mobile communication terminal through different mobile communication networks according to an embodiment of the present invention. As shown, the system includes the first mobile communication terminal 100 communicating with the second mobile communication terminal 200 over a multimedia gateway 400. The first terminal 100 multiplexes and outputs video/audio data relevant to a video call service and multimedia data relevant to an additional service. Further, the first terminal 100 uses a first video call service specification.

In addition, the second terminal 200 demultiplexes the converted data and uses a second video call service specification. The multimedia gateway 400 converts data output based on the first video call service specification into a format corresponding to the second video call service specification. As shown, the multimedia gateway 400 includes a transcoding unit 410 for converting the video/audio data by a corresponding video/audio codec, and a protocol conversion unit 420 for converting a message having the multimedia data into a corresponding message format.

An operation of the system for providing a video call of a mobile communication terminal through different mobile communication networks according to the present invention will now be explained in detail with reference to FIG. 7. First, the first terminal 100 multiplexes and outputs video/audio data relevant to a video call service and multimedia data relevant to an additional service based on the first video call service specification. Then, the multimedia gateway 400 converts the output data based on the first video call service specification into a format corresponding to the second video call service specification.

That is, the media transcoding unit 410 converts the video/audio data using a corresponding video/audio codec, and the protocol conversion unit 420 converts a message including the multimedia data into a corresponding message format. The second communication terminal 200 then demultiplexes the converted data based on the second video call service specification and outputs the converted data. Accordingly, the second communication terminal 200 can implement a video call service based on the video/audio data, and can implement an additional service based on the multimedia data.

Figure 8:
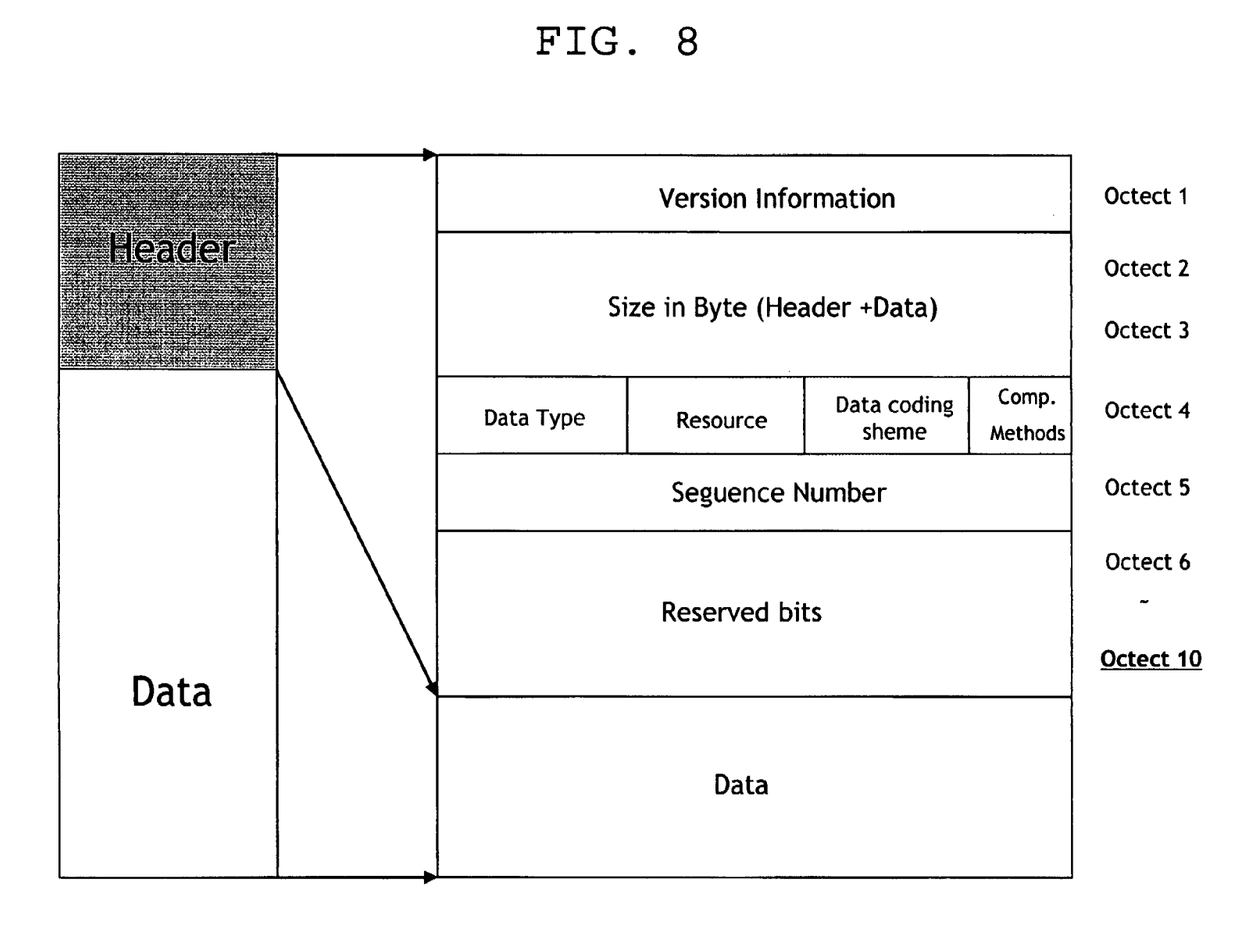
FIG. 8 is an overview illustrating a format of multimedia data transceived during a video call according to an embodiment of the present invention.

Turning now to FIG. 8, which is an overview illustrating a format of multimedia data transceived during a video call according to an embodiment of the present invention. As shown, the data format is divided into a Header portion and a Data portion. The Header portion includes a Version Information filed representing a current version of a data format, a Size in Byte field representing a size of a Byte unit including the Header portion and the Data portion, a Data Type field representing a type of data to be transceived, a 1 bit Resource field representing whether or not a standard resource for current data can be used, a Data Coding Scheme field representing information relevant to a data coding (e.g., KSC 5601 or UTF8 (ASCII)), a Compression Method field using the last 2 bits of an octet for compression or coding, a Sequence Number field representing a generation order of a message to be transceived, and Reserved Bits field allocated to provide an expandability and a characteristic capability for a manufacturing company. In addition, the Data portion represents a data value input by a user through a User Interface and has a data value encoded using a KSC5601 coded process when a Korean WCDMA terminal is used. When using on American WCDMA terminal the data value is encoded using the appropriate coded process.

Figure 9:
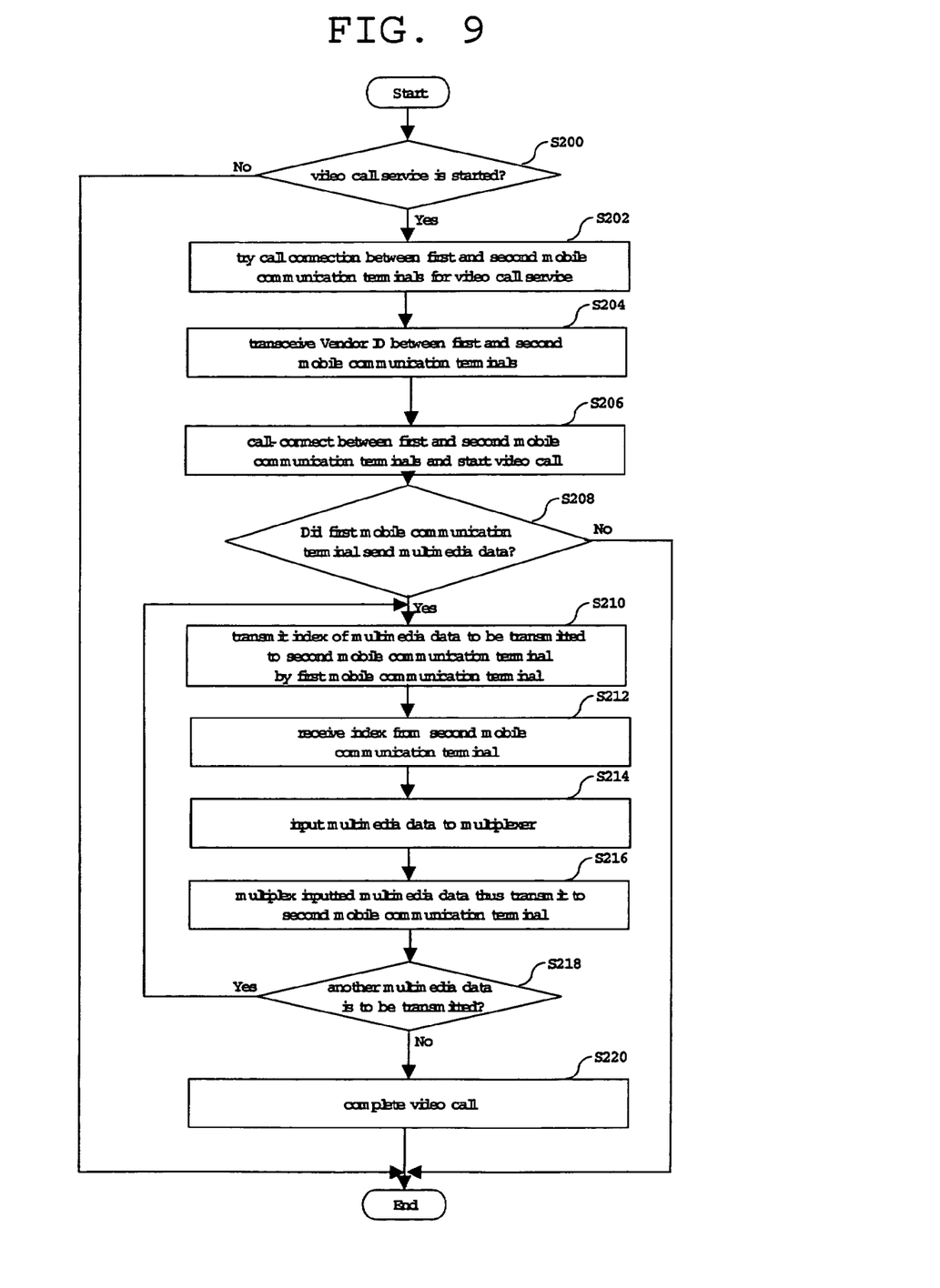
FIG. 9 is a flowchart showing a method for providing a video call service for a mobile terminal according to an embodiment of the present invention.

Next, FIG. 9 is a flowchart illustrating a method for providing a video call service for a mobile communication terminal according to an embodiment of the present invention. As shown, the method includes determining if a video call service is to be started (S200), and when the video call service is to be started (Yes in S200), establishing a call connection between a first mobile communication terminal and a second mobile communication terminal (S202). Next, the first and second terminals exchange a Vendor ID message using the H.245 standard (S204). In this example, it is assumed the first terminal is transmitting and the second terminal is receiving.

In addition, as noted above, the Vendor ID message includes a nation code, a manufacturing company code, a model name, version information, etc. When the first and second terminals have completed the process of exchanging the Vendor ID message, a call connection is performed between the first and second terminals and the video call is started (S206). Then, the method determines if the first user wants to transmit multimedia data in addition to the voice call (S208). If the user wants to send multimedia data (Yes in S208), the first mobile terminal transmits an index of multimedia data to be transmitted to the second mobile terminal (S210). In addition, as discussed above, the multimedia data includes data such as audio data, video data, text data, etc.

The second terminal then receives the transmitted index (S212), and the first terminal inputs, multiplexes and transmits the multimedia data using the H.233 multiplexer to the second terminal (S214 and S216). When the data to be transmitted is video data, the video data is processed using an H.263 or an MPEG 4 processor and then input into the H.233 multiplexer. When the data to be transmitted is audio data, the audio data is processed using an AMR or G.723.1 processor and then input into the multiplexer. The method also determines if more multimedia data is to be transmitted to the second terminal (S218). When more multimedia data is to be transmitted (Yes in S218), the method returns to step S110. Otherwise, the additional service is completed.

In addition, the second terminal receives the multimedia data during a video call, and determines whether an additional service for replaying the received data is required. Also, the transmitted multimedia index can be added to the Vendor ID exchange process in step S204, or as discussed above can be transmitted during step S210. Further, the index includes not only an index of multimedia to be transmitted but also an index version between the first and second terminals.

Also, the additional service may be transmitting text data during a video call service, transmitting video, audio, and text data for an automatic response service, transmitting audio data for a background music service, transmitting video data for a substitute video service, and/or transmitting a preset code or symbol data for a bi-directional system control service. Further, the additional service is not limited to a video chat service, an automatic response service, a background music service, and a substitute video service, etc, and can also include a service capable of enhancing a user's convenience without influencing the quality of a video call service.

When the additional service is selected, the first terminal 100 inputs multimedia data relevant to the additional service to the H.233 multiplexer, and processes multimedia data relevant to the additional service using the H.245 protocol. Then, the first terminal 100 inputs the processed multimedia data to the H.233 multiplexer through the Control Channel Segmentation and Re-assembly Layer (CCSRL) and the Numbered Simple Retransmission Protocol (NSRP). The H.233 multiplexer multiplexes the input video/audio data and the input multimedia data to generate one bit stream, and transmits the generated bit stream to the second terminal 200 through the mobile communication network.

Thus, according to an embodiment of the present invention, a video call be provided through a same communication network and also through different communication networks. In addition, multimedia data relevant to an additional service is transmitting and received in real time while a video call service is performed using the H.324M protocol. Accordingly, an additional protocol is not required thereby enhancing the user's convenience during the video call. Also, the additional service such as a video chat service may be used simultaneously during the video call.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal, comprising:
   an input unit configured to receive multimedia data corresponding to an additional service other than an established video call;
   a controller configured to codec-process the received multimedia data and to perform a negotiation with a receiving terminal by transmitting a Master/Slave Determination message to the receiving terminal to determine a master/slave relationship with the receiving terminal, transmitting a Terminal Capacity Set message to the receiving terminal to determine a capability for processing transmitted video and audio data, transmitting a Multiplex Entry Send message to the receiving terminal to exchange a Multiplex Entry, transmitting an Open Logical Channel Audio message to the receiving terminal to open a Logical Channel for transmitting audio data, and transmitting an Open Logical Channel Video message to the receiving terminal to open a Logical Channel for transmitting video data; and
   a transceiver configured to transmit the multimedia data during the established video call.

2. The mobile terminal of claim 1, further comprising:
   a multiplexer configured to multiplex the multimedia data and data corresponding to the video call.

3. The mobile terminal of claim 1, wherein the multimedia data is transmitted to the receiving terminal using an H.245 control signaling protocol.

4. The mobile terminal of claim 1, wherein the controller includes a codec module configured to codec-process the multimedia data.

5. The mobile terminal of claim 1, wherein the input unit is further configured to receive a control command to control the receiving terminal, and the transceiver is further configured to transmit the control command to the receiving terminal using an H.245 control signal protocol.

6. The mobile terminal of claim 5, wherein the control command is a vibration mode control command or a key pad control command configured to control the receiving terminal.

7. The mobile terminal of claim 1, wherein the additional service is a service of transmitting video, audio, and text data for an automatic response service, transmitting audio data for a background music service, transmitting video data for a substitute video service, transmitting a preset code or symbol data for a bi-directional system control service, or transmitting multimedia data related to a chat service.

8. A method of a first mobile communication terminal, the method comprising:
   establishing a video call connection with a second mobile communication terminal for a video call;
   transmitting a Master/Slave Determination message to the second mobile communication terminal to determine a master/slave relationship between the first and second mobile communication terminals;
   transmitting a Terminal Capacity Set message to the second mobile communication terminal to set a capability for processing video and audio data transmitted to the second mobile communication terminal;
   transmitting a Multiplex Entry Send message to the second mobile communication terminal to exchange a Multiplex Entry with the second mobile communication terminal;
   transmitting an Open Logical Channel Audio message to the second mobile communication terminal to open a Logical Channel for transmitting audio data;
   transmitting an Open Logical Channel Video message to the second mobile communication terminal to open a Logical Channel for transmitting video data; and
   performing an additional service of transmitting multimedia data to the second mobile communication terminal during the video call.

9. The method of claim 8, further comprising:
   notifying a user of the first mobile communication terminal if the second mobile communication terminal does not respond to a request to perform the additional service within a predetermined amount of time.

10. The method of claim 8, wherein the additional service is a service of transmitting video, audio, and text data for an automatic response service, transmitting audio data for a background music service, transmitting video data for a substitute video service, transmitting a preset code or symbol data for a bi-directional system control service, or transmitting multimedia data related to a video chat service.

11. The method of claim 8, further comprising:
    transmitting a control command to the second mobile communication terminal using an H.245 control signal protocol.

12. The method of claim 11, wherein the control command is a vibration mode control command or a key pad control command configured to control the second mobile communication terminal.

13. The method of claim 8, wherein the video call and the additional service are based on an H.324 M protocol.

* * * * *